United States Patent Office 3,105,843
Patented Oct. 1, 1963

3,105,843
4,4-DIMETHYL PREGNANES
George Rosenkranz and Albert Bowers, Mexico City, Mexico, assignors, by mesne assignments, to Syntex Corporation, a corporation of Panama
No Drawing. Filed Apr. 19, 1961, Ser. No. 103,970
18 Claims. (Cl. 260—397.45)

The present invention relates to cyclopentanophenanthrene compounds and to a process for their production. More particularly the present invention relates to novel 4,4-dimethyl pregnane compounds.

The novel compounds of the present invention surprisingly, in view of the corticoid-like structure, have anti-corticoid, anti-estrogenic, anti-gonadotrophic and anti-androgenic activity and are therefore therapeutically usable in a known manner. In addition to the mentioned activities the 11-oxygenated derivatives are also potent inhibitors of the pituitary hormone.

The novel compounds of the present invention are illustrated by the following formulas:

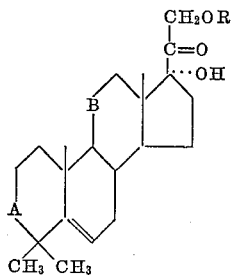

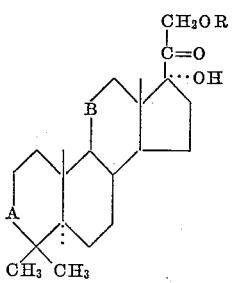

In the above formulas R represents hydrogen or the acyl radical of a hydrocarbon carboxylic acid; A represents the carbonyl group ($>C=O$) or the β-hydroxymethylene or β-hydrocarbon carboxylic acyloxymethylene group

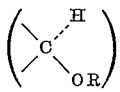

B represents methylene ($>CH_2$), carbonyl ($>C=O$) or β-hydroxymethylene

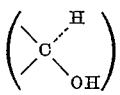

The acyl radical is derived from a hydrocarbon carboxylic acid of less than 12 carbon atoms, saturated or unsaturated, of straight, branched, cyclic or mixed cyclic-aliphatic chain, substituted or not with methoxy, halogen or other groups. Typical ester groups are the acetate, propionate, butyrate, hemisuccinate, enanthate, caproate, benzoate, trimethylacetate, phenoxyacetate, cyclopentylpropionate, phenylpropionate and β-chloropropionate.

The novel compounds of the present invention are prepared by a novel process illustrated by the following equation:

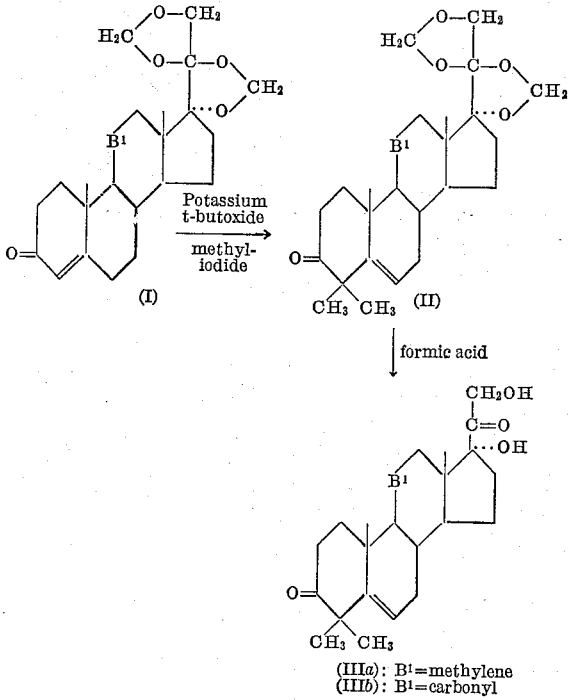

(IIIa): $B^1$=methylene
(IIIb): $B^1$=carbonyl

In the above equation $B^1$ represents the carbonyl or the methylene groups.

In practicing the above process, the 17,20;20,21-bis-methylenedioxy derivative of Reichstein's compound "S" or of cortisone (I) prepared by conventional reaction, is treated with methyl iodide in the presence of an in situ prepared alkali metal lower alkoxide such as potassium t-butoxide at room temperature for a period of time of the order of 10 to 24 hours. The resultant product is the corresponding 4,4-dimethyl-$\Delta^5$-derivative (II). The latter compounds may then be treated with a mild acid such as formic acid to reconstitute the cortical side chain and produce respectively, 4,4-dimethyl-$\Delta^5$-pregnene-17α,21-diol-3,20-dione (IIIa) or 4,4-dimethyl-$\Delta^5$-pregnene-17α,21-diol-3,11,20-trione (IIIb), which may then be conventionally esterified at C-21 by reaction with a hydrocarbon carboxylic acid anhydride of less than 12 carbon atoms of the type described hereinabove.

The above compounds which are active hormones having the uses and properties hereinbefore set forth are also intermediates for the production of the other compounds hereinbefore described. Thus in the form of the bis-methylenedioxy derivatives, they may be utilized to form compounds with the β-hydroxy group at C-3 in accordance with the following equation:

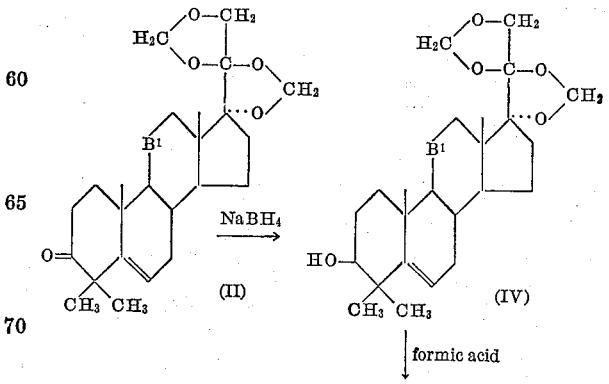

| formic acid

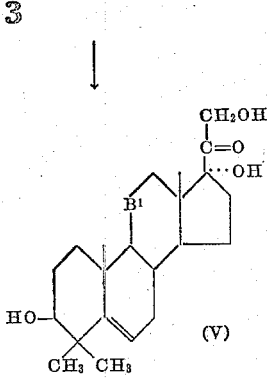

In the above equation B¹ has the same meaning as previously described.

As indicated above, mild reduction with a double metal hydride, preferably sodium borohydride, of II gives the corresponding 3-alcohol (IV) and treatment of the latter with a mild acid such as formic acid as described previously affords 4,4-dimethyl-Δ⁵-pregnene-3β,17α,21-triol-20-one or 4,4-dimethyl-Δ⁵-pregnene-3β,17α,21-triol-11,20-dione (V).

More drastic treatment with the double metal hydride, i.e. treatment with sodium borohydride for 18 hours or with lithium aluminum hydride under reflux conditions results in reduction of the keto groups at both C-3 and C-11. Thus such treatment of the 17,20;20,21-bismethyl-enedioxy derivative of 4,4-dimethyl-Δ⁵-pregnene-17α,21-diol-3,11,20-trione results in the formation of the 17,20; 20,21-bismethylenedioxy derivative of 4,4-dimethyl-Δ⁵-pregnene-3β,11β,17α,21-tetrol-20-one and further treatment of this last named compound with mild acid affords 4,4-dimethyl-Δ⁵-pregnene-3β,11β,17α,21-tetrol-20-one.

4,4-dimethyl-Δ⁵-pregnene-17α,21-diol-3,11,20-trione is also an intermediate for the production of the corresponding 11β-hydroxy-compound by a conventional method involving temporary protection of the C-3 and C-20 keto groups, as by formation of the bis-ketals and reduction with lithium aluminum hydride. This process is illustrated by the following equation:

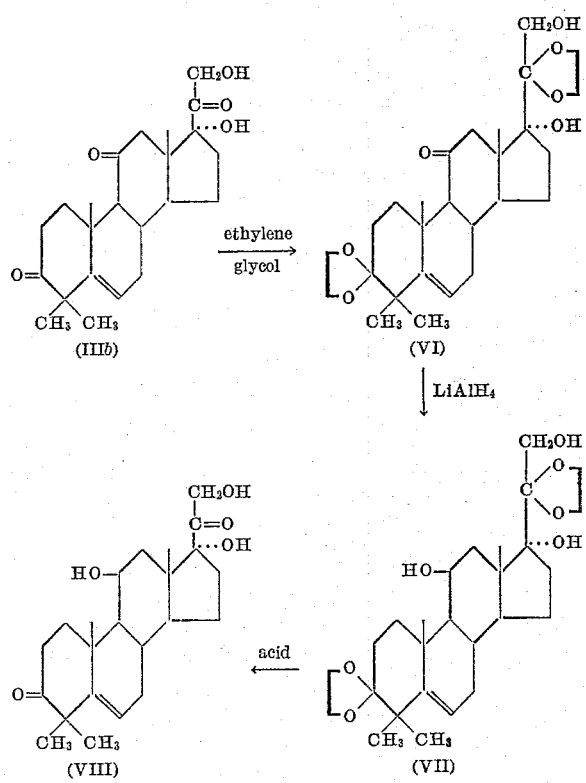

It may be noted that the reduction of the 11-keto group is essentially the same as previously described in connection with C-3 and C-11 keto reduction previously described and that the same process may also be applied to other 11-keto compounds such as 4,4-dimethyl-allopregnane-3β,17α,21-triol-11,20-dione.

The Δ³-compounds previously set forth are also intermediates for the preparation of the corresponding saturated compounds by hydrogenation in the presence of a hydrogenation catalyst such as for example a platinum or palladium catalyst. This hydrogenation may be applied to either the 17,20;20,21-bismethylenedioxy compounds as illustrated in the following diagram or to the final compounds as for example the hydrogenation of 4,4-dimethyl-Δ⁵-pregnene-17α,21-diol-3,11,20-trione to 4,4-dimethyl-allopregnane-17α,21-diol-3,11,20-trione.

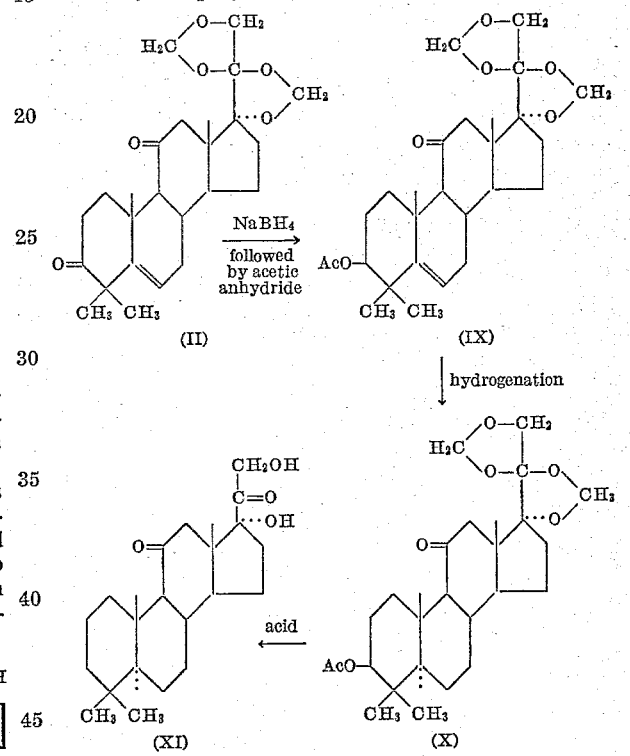

In the above equation, Ac represents the acetyl radical. Although the hydrogenation is preceded by reduction of the C-3 keto group and acetylation, these preliminary steps are not necessary. The acetate group of compound XI may be hydrolyzed as by treatment with dilute methanolic potassium carbonate to afford 4,4-dimethyl-allopregnane-3β,17α,21-triol-11,20-dione.

Upon conventional esterification of the 3-keto compounds with hydrocarbon carboxylic acid anhydrides of less than 12 carbon atoms of the type described previously, there are obtained the C-21 esters whereas conventional esterification of the 3β-hydroxy compounds results in formation of the 3,21-diesters.

The following specific Examples serve to illustrate but are not intended to limit the present invention:

*Example I*

A mixture of 50 g. of cortisone, 2 liters of chloroform, 500 cc. of 35% aqueous formaldehyde and 500 cc. of concentrated hydrochloric acid was stirred at room temperature for 72 hours, the organic layer was washed with 5% sodium carbonate aqueous solution and water to neutral, dried over anhydrous sodium sulfate and evaporated to dryness under reduced pressure. Crystallization of the residue from acetone-methylene chloride gave the 17,20;20,21-bismethylenedioxy derivative of cortisone.

A solution of 3.25 g. of the above mentioned derivative in 180 cc. of t-butyl alcohol was added to a solution of 1.82 g. of potassium in 120 cc. of anhydrous t-butyl alcohol (prepared under nitrogen atmosphere), and the mixture treated with 5.0 cc. of methyl iodide at room temperature. It was then stirred under nitrogen atmosphere for 18 hours, evaporated under vacuum to a small volume, diluted with 5% aqueous hydrochloric acid and the formed precipitate collected by filtration, washed with water to neutral and air dried, thus giving 2.1 g. of the 17,20;20,21 bismethylenedioxy derivative of 4,4 - dimethyl - $\Delta^5$ - pregnene - 17α,21 - diol - 3,11,20 - trione. The compound had a melting point of 258–260° C.; [α]$_D$ —76° (chloroform). There was no selective absorption in the ultraviolet.

A suspension of 1 g. of the above product in 25 cc. of 60% formic acid, was heated at 90° for 30 minutes. After 10 minutes all the steroid had dissolved. Addition of water, isolation of the product with ethyl acetate and crystallization from acetonehexane gave 4,4-dimethyl-$\Delta^5$-pregnene-17α,21-diol-3,11,20-trione. This compound had a melting point of 206–208° C.; [α]$_D$ +35° (chloroform).

*Example II*

1 g. of this last product was added to a mixture of 8 cc. of ethylene glycol and 80 cc. of benzene containing 150 mg. of p-toluenesulfonic acid and heated under reflux with a Dean-Stark attachment to remove the water as it was formed. After 20 hours under reflux, the p-toluenesulfonic acid was neutralized with a sodium carbonate solution and the product isolated by evaporation of the benzene. Alumina chromatography afforded the 3,20-biscycloethylene ketal of the 4,4-dimethyl-$\Delta^5$-pregnene - 17α,21 - diol - 3,11,20 - trione (4,4 - dimethyl - 3,20-bis-ethylenedioxy-$\Delta^5$-pregnene-17α,21-diol-11-one).

A solution of 500 mg. of this compound in 25 cc. of dry tetrahydrofuran was added to a refluxing suspension of 500 mg. of lithium aluminum hydride in 25 cc. of dry tetrahydrofuran over 15 minutes. Refluxing was continued for 16 hours. Addition of dilute hydrochloric acid and extraction of the product with ethyl acetate afforded a compound which was kept in a mixture of 25 cc. of acetic acid and 2 cc. of 2 N hydrochloric acid for 1 hour. Addition of water, filtration and crystallization gave 4,4-dimethyl-$\Delta^5$-pregnene-11β,17α,21-triol-3,20-dione.

*Example III*

1 g. of the 17,20;20,21-bismethylenedioxy derivative of 4,4 - dimethyl - $\Delta^5$ - pregnene - 17α,21 - diol - 3,11,20 - trione (obtained by the procedure described in Example I) dissolved in 100 cc. of methanol was mixed with 300 mg. of sodium borohydride in 1 cc. of water and the mixture was kept for 1 hour at room temperature. The excess reagent was decomposed by addition of acetic acid and the resulting solution was concentrated under vacuum to a small volume, diluted with water and extracted with ethyl acetate. The extract was washed with water, dried over sodium sulfate and evaporated, thus giving the 17,20;20,21-bismethylenedioxy derivative of 4,4-dimethyl-$\Delta^5$-pregnene-3β,17α,21-triol-11,20-dione.

This compound was treated with acetic anhydride and pyridine for 16 hours at room temperature. Addition of water, filtration and crystallization gave the 17,20;20,21 - bismethylenedioxy derivative of 4,4 - dimethyl - 3β - acetoxy-$\Delta^5$-pregnene-17α,21-diol-11,20-dione.

1 g. of this compound in 50 cc. of acetic acid was heated to 80° C. and stirred in an atmosphere of hydrogen in the presence of 75 mg. of platinum until 1.0 mol of hydrogen was taken up. The resulting mixture was filtered and concentrated under vacuum to a small volume. After dilution with ethyl acetate, the mixture was washed with sodium carbonate solution, dried over sodium sulfate and evaporated to dryness, thus giving the 17,20;20,21-bismethylenedioxy derivative of 4,4-dimethyl-3β-acetoxy-allopregnane-17α,21-diol-11,20-dione.

750 mg. of this compound were heated under reflux for 2 hours with 25 cc. of 80% acetic acid. Addition of water and filtration gave 4,4-dimethyl-3β-acetoxy-allopregnane-17α,21-diol-11,20-dione.

A suspension of 340 mg. of the foregoing steroid in 30 cc. of methanol was treated at 0° C. with a solution of 150 mg. of potassium carbonate in 3 cc. of water, the operation being conducted under nitrogen. The mixture was kept at room temperature for 90 minutes with occasional swirling. The excess carbonate was neutralized with acetic acid, water was added, the resulting mixture was cooled to 0° C. and the precipitate formed was collected. Crystallization from acetone-hexane afforded 4,4-dimethyl-allopregnane-3β,17α,21-triol-11,20-dione.

*Example IV*

1 g. of 4,4-dimethyl-3β-acetoxy-allopregnane-17α,21-diol-11,20-dione was added to a mixture of 8 cc. of ethylene glycol and 80 cc. of benzene containing 150 mg. of p-toluenesulfonic acid and heated under reflux with an attachment to remove the water as it is formed. After 20 hours under reflux the p-toluenesulfonic acid was neutralized with a sodium carbonate solution, and the product isolated by evaporation of the benzene. Alumina chromatography afforded 4,4 - dimethyl - 20 - ethylenedioxy - 3β - acetoxy - allopregnane - 17α,21 - diol-11-one.

This last compound was reduced with lithium aluminum hydride following the procedure described in Example I, thus yielding 4,4-dimethyl-allopregnane-3β,11β,17α,21-tetrol-20-one.

*Example V*

A suspension of 1 g. of the 17,20;20,21-bismethylenedioxy derivative of 4,4-dimethyl-$\Delta^5$-pregnene-3β,17α,21-triol-11,20-dione (obtained according to Example II) in 125 cc. of 60% formic acid was treated following the method described in Example I. Crystallization from acetone-hexane afforded 4,4-dimethyl - $\Delta^5$ - pregnene-3β,17α,21-triol-11,20-dione.

*Example VI*

50 g. of Reichstein's "S" compound ($\Delta^4$-pregnene-17α,21-diol-3,20-dione) were treated following the procedure described in Example I. Crystallization from acetone-methylene chloride afforded 38 g. of the 17,20;20,21-bismethylenedioxy derivative of $\Delta^4$-pregnene-17α,21-diol-3,20-dione. The compound had a melting point of 254–256° C.

3.2 g. of the foregoing derivative were treated with methyl iodide such as described in Example I, thus affording 2 g. of a compound with a melting point of 256–260° C.

Washed alumina chromatography yielded a product which crystallized from benzene-hexane giving the 17,20;20,21 bismethylenedioxy derivative of the 4,4-dimethyl-$\Delta^5$-pregnene-17α,21-diol-3,20-dione. This last compound had a melting point of 280–82° C.; [α]$_D$ —109.4°. There was no selective absorption in the ultraviolet.

1 g. of this steroid was treated with 60% formic acid in accordance with the method described in Example I. Silica-celite chromatography of the crude product, afforded 4,4 - dimethyl-$\Delta^5$-pregnene-17α,21-diol-3,20-dione with a melting point of 200–202° C. After several recrystallizations from acetone, the melting point was raised to 217–19° C., [α]$_D$ —10° (chloroform).

*Example VII*

1 g. of the 17,20;20,21-bismethylenedioxy derivative of 4,4-dimethyl-$\Delta^5$-pregnene-17α,21-diol-3,20-dione (obtained according to Example VI) was reduced with sodium borohydride following the procedure described in Example III. Crystallization from acetone-hexane afforded the 17,20;20,21-bismethylenedioxy derivative of 4,4-dimethyl-$\Delta^5$-pregnene-3β,17α,21-triol-20-one.

This compound was treated with acetic anhydride-pyridine for 16 hours at room temperature. After working up in a conventional manner, the product obtained was the 17,20;20,21-bismethylenedioxy derivative of 4,4-dimethyl-3β-acetoxy-Δ⁵-pregnene-17α,21-diol-20-one.

1 g. of this compound was hydrogenated in acetic acid in the presence of platinum, following the procedure described in Example III, thus giving the 17,20;20,21-bismethylenedioxy derivative of 4,4-dimethyl-3β-acetoxy-allopregnane-17α,21-diol-20-one.

750 mg. of this compound was heated under reflux for 2 hours with 25 cc. of 80% acetic acid. Addition of water and filtration of the precipitate formed gave 4,4-dimethyl-3β-acetoxy-allopregnane-17α,21-diol-20-one.

350 mg. of the above steroid was hydrolyzed with potassium carbonate in a nitrogen atmosphere by following the technique described in Example III. Upon crystallization of the crude product from acetone-hexane, 4,4-dimethyl-allopregnane-3β,17α,21-triol-20-one was obtained.

Example VIII 1 g. of the 17,20;20,21-bismethylenedioxy derivative of 4,4-dimethyl-Δ⁵-pregnene-3β,17α,21-triol-20-one (obtained according to Example VII) was hydrolyzed with 60% formic acid following the method described in Example I, giving after crystallization from acetone-hexane, 4,4-dimethyl-Δ⁵-pregnene-3β,17α,21-triol-20-one.

Example IX 1 g. of 4,4-dimethyl-Δ⁵-pregnene-3β,17α,21-triol-11,20-dione, in 30 cc. of pyridine was treated at 0° C. with 1.1 mol equivalents of acetic anhydride. The solution was kept at this temperature for 5 hours, poured into ice water and extracted with ethyl acetate. The extract was washed with dilute hydrochloric acid, 5% sodium bicarbonate aqueous solution and water to neutral, and evaporated to dryness. Crystallization from acetone-hexane afforded the 21-acetate of 4,4-dimethyl-Δ⁵-pregnene-3β,17α,21-triol-11,20-dione.

By the above procedure, using the acid anhydride indicated, there were obtained the products set forth below from the starting materials named.

| Starting compound | Acid anhydride | Product |
|---|---|---|
| 4,4-dimethyl-Δ⁵-pregnene-17α,21-diol-3,11,20-trione. | acetic | 21-acetate of 4,4-dimethyl-Δ⁵ pregnene-17α,21-diol-3,11,20-trione. |
| Do | caproic | 21-caproate of 4,4-dimethyl-Δ⁵-pregnene-17α,21-diol-3,11,20-trione. |
| Do | cyclopentylpropionic | 21-cyclopentylpropionate of 4,4-dimethyl-Δ⁵-pregnene-17α,21-diol-3,11,20-trione. |
| Do | benzoic | 21-benzoate of 4,4-dimethyl-Δ⁵-pregnene-17α,21-diol-3,11,20-trione. |
| 4,4-dimethyl-Δ⁵-pregnene-17α,21-diol-3,20-dione. | acetic | 21-acetate of 4,4-dimethyl-Δ⁵-pregnene-17α,21-diol-3,20-dione. |
| Do | caproic | 21-caproate of 4,4-dimethyl-Δ⁵-pregnene-17α,21-diol-3,20-dione. |
| Do | cyclopentylpropionic | 21-cyclopentylpropionate of 4,4-dimethyl-Δ⁵-pregnene-17α,21-diol-3,20-dione. |
| Do | benzoic | 21-benzoate of 4,4-dimethyl-Δ⁵-pregnene-17α,21-diol-3,20-dione. |
| 4,4-dimethyl-Δ⁵-pregnene-11β,17α,21-triol-3,20-dione. | acetic | 21-acetate of 4,4-dimethyl-Δ⁵-pregnene-11β,17α,21-triol-3,20-dione. |
| Do | caproic | 21-caproate of 4,4-dimethyl-Δ⁵-pregnene-11β,17α,21-triol-3,20-dione. |
| Do | cyclopentylpropionic | 21-cyclopentylpropionate of 4,4-dimethyl-Δ⁵-pregnene-11β,17α,21-triol-3,20-dione. |
| Do | benzoic | 21-benzoate of 4,4-dimethyl-Δ⁵-pregnene-11β,17α,21-triol-3,20-dione. |
| 4,4-dimethyl-3β-acetoxy-allopregnane-17α,21-diol-11,20-dione. | caproic | 21-caproate of 4,4-dimethyl-3β-acetoxy-allopregnane-17α,21-diol-11,20-dione. |
| Do | cyclopentylpropionic | 21-cyclopentylpropionate of 4,4-dimethyl-3β-acetoxy-allopregnane-17α,21-diol-11,20-dione. |
| Do | benzoic | 21-benzoate of 4,4-dimethyl-3β-acetoxy-allopregnane-17α,21-diol-11,20-dione. |
| 4,4-dimethyl-3β-acetoxy-allopregnane-17α,21-diol-20-one. | caproic | 21-caproate of 4,4-dimethyl-3β-acetoxy-allopregnane-17α,21-diol-20-one. |
| Do | cyclopentylpropionic | 21-cyclopentylpropionate of 4,4-dimethyl-3β-acetoxy-allopregnane-17α,21-diol-20-one. |
| Do | benzoic | 21-benzoate of 4,4-dimethyl-3β-acetoxy-allopregnane-17α,21-diol-20-one. |
| 4,4-dimethyl-Δ⁵-pregnene-3β,17α,21-triol-11,20-dione. | caproic | 21-caproate of 4,4-dimethyl-Δ⁵-pregnene-3β,17α,21-triol-11,20-dione. |
| Do | cyclopentylpropionic | 21-cyclopentylpropionate of 4,4-dimethyl-Δ⁵-pregnene-3β,17α,21-triol-11,20-dione. |
| Do | benzoic | 21-benzoate of 4,4-dimethyl-Δ⁵-pregnene-3β,17α,21-triol-11,20-dione. |
| 4,4-dimethyl-allopregnane-3β,17α,21-triol-11,20-dione. | acetic | 21-acetate of 4,4-dimethyl-allopregnane-3β,17α,21-triol-11,20-dione. |
| Do | caproic | 21-caproate of 4,4-dimethyl-allopregnane-3β,17α,21-triol-11,20-dione. |
| Do | cyclopentylpropionic | 21-cyclopentylpropionate of 4,4-dimethyl-allopregnane-3β,17α,21-triol-11,20-dione. |
| Do | benzoic | 21-benzoate of 4,4-dimethyl-allopregnane-3β,17α,21-triol-11,20-dione. |
| 4,4-dimethyl-allopregnane-3β,11β,17α,21-tetrol-20-one. | acetic | 21-acetate of 4,4-dimethyl-allopregnane-3β,11β,17α,21-tetrol-20-one. |
| Do | caproic | 21-caproate of 4,4-dimethyl-allopregnane-3β,11β,17α,21-tetrol-20-one. |
| Do | cyclopentylpropionic | 21-cyclopentylpropionate of 4,4-dimethyl-allopregnane-3β,11β,17α,21-tetrol-20-one. |
| Do | benzoic | 21-benzoate of 4,4-dimethyl-allopregnane-3β,11β,17α,21-tetrol-20-one. |
| 4,4-dimethyl-Δ⁵-pregnene-3β,17α,21-triol-20-one. | acetic | 21-acetate of 4,4-dimethyl-Δ⁵-pregnene-3β,17α,21-triol-20-one. |
| Do | caproic | 21-caproate of 4,4-dimethyl-Δ⁵-pregnene-3β,17α,21-triol-20-one. |
| Do | cyclopentylpropionic | 21-cyclopentylpropionate of 4,4-dimethyl-Δ⁵-pregnene-3β,17α,21-triol-20-one. |
| Do | benzoic | 21-benzoate of 4,4-dimethyl-Δ⁵-pregnene-3β,17α,21-triol-20-one. |
| 4,4-dimethyl-allopregnane-3β,17α,21-triol-20-one. | acetic | 21-acetate of 4,4-dimethyl-allopregnane-3β,17α,21-triol-20-one. |
| Do | caproic | 21-caproate of 4,4-dimethyl-allopregnane-3β,17α,21-triol-20-one. |
| Do | cyclopentylpropionic | 21-cyclopentylpropionate of 4,4-dimethyl-allopregnane-3β,17α,21-triol-20-one. |
| Do | benzoic | 21-benzoate of 4,4-dimethyl-allopregnane-3β,17α,21-triol-20-one. |

Example X 1 g. of 4,4-dimethyl-Δ⁵-pregnene-3β,17α,21-triol-11,20-dione in 30 cc. of pyridine was treated with 5 mol. equivalents of acetic anhydride. The mixture was kept for 18 hours at room temperature, then poured into ice water and extracted with ethyl acetate. The extract was washed with a dilute hydrochloric acid solution, and water to neutral and evaporated to dryness. Crystallization from acetone-hexane afforded the 3β,21-diacetate of 4,4-dimethyl-Δ⁵-pregnene-3β,17α,21-triol-11,20-dione.

By the above procedure, using the acid anhydride indicated there were obtained the products set forth below from their corresponding starting materials.

| Starting compound | Acid anhydride | Product |
|---|---|---|
| 4,4-dimethyl-Δ⁵-pregnene-3β,17α,21-triol-11,20-dione. | caproic | 3β,21-dicaproate of 4,4-dimethyl-Δ⁵-pregnene-3β,17α,21-triol-11,20-dione. |
| Do | cyclopentyl-propionic. | 3β,21-bis(cyclopentyl-propionate) of 4,4-dimethyl-Δ⁵-pregnene-3β,17α,21-triol-11,20-dione. |
| Do | benzoic | 3β,21-dibenzoate of 4,4-dimethyl-Δ⁵-pregnene-3β,17α,21-triol-11,20-dione. |
| 4,4-dimethyl-allopregnane-3β,17α,21-triol-11,20-dione. | acetic | 3β,21-diacetate of 4,4-dimethyl-allopregnane-3β,17α,21-triol-11,20-dione. |
| Do | caproic | 3β,21-dicaproate of 4,4-dimethyl-allopregnane-3β,17α,21-triol-11,20-dione. |
| Do | cyclopentyl-propionic. | 3β,21-bis(cyclopentyl-propionate) of 4,4-dimethyl-allopregnane-3β,17α,21-triol-11,20-dione. |
| Do | benzoic | 3β,21-dibenzoate of 4,4-dimethyl-allopregnane-3β,17α,21-triol-11,20-dione. |
| 4,4-dimethyl-allopregnane-3β,11β,17α,21-tetrol-20-one. | acetic | 3β,21-diacetate of 4,4-dimethyl-allopregnane-3β,11β,17α,21-tetrol-20-one. |
| Do | caproic | 3β,21-dicaproate of 4,4-dimethyl-allopregnane-3β,11β,17α,21-tetrol-20-one. |
| Do | cyclopentyl-propionic. | 3β,21-bis(cyclopentyl-propionate) of 4,4-dimethyl-allopregnane-3β,11β,17α,21-tetrol-20-one. |
| Do | benzoic | 3β,21-dibenzoate of 4,4-dimethyl-allopregnane-3β,11β,17α,21-tetrol-20-one. |
| 4,4-dimethyl-Δ⁵-pregnene-3β,17α,21-triol-20-one. | acetic | 3β,21-diacetate of 4,4-dimethyl-Δ⁵-pregnene-3β,17α,21-triol-20-one. |
| Do | caproic | 3β,21-dicaproate of 4,4-dimethyl-Δ⁵-pregnene-3β,17α,21-triol-20-one. |
| Do | cyclopentyl-propionic. | 3β,21-bis(cyclopentyl-propionate) of 4,4-dimethyl-Δ⁵-pregnene-3β,17α,21-triol-20-one. |
| Do | benzoic | 3β,21-dibenzoate of 4,4-dimethyl-Δ⁵-pregnene-3β,17α,21-triol-20-one. |
| 4,4-dimethyl-allopregnane-3β,17α,21-triol-20-one. | acetic | 3β,21-diacetate of 4,4-dimethyl-allopregnane-3β,17α,21-triol-20-one. |
| Do | caproic | 3β,21-dicaproate of 4,4-dimethyl-allopregnane-3β,17α,21-triol-20-one. |
| Do | cyclopentyl-propionic. | 3β,21-bis(cyclopentyl-propionate) of 4,4-dimethyl-allopregnane-3β,17α,21-triol-20-one. |
| Do | benzoic | 3β,21-dibenzoate of 4,4-dimethyl-allopregnane-3β,17α,21-triol-20-one. |

We claim:
1. A compound of the following formula:

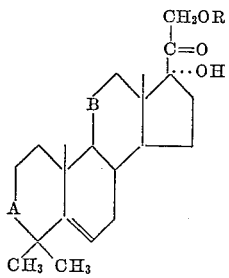

wherein A is selected from the group consisting of carbonyl, β-hydroxymethylene and β-hydrocarbon carboxylic acyloxymethylene of less than 12 carbon atoms; B is selected from the group consisting of methylene, carbonyl and β-hydroxymethylene and R is selected from the group consisting of hydrogen and a hydrocarbon carboxylic acyl group of less than 12 carbon atoms.

2. 4,4-dimethyl-Δ⁵-pregnene-17α,21-diol-3,11,20-trione.
3. The C–21 hydrocarbon carboxylic acid esters of less than 12 carbon atoms of 4,4-dimethyl-Δ⁵-pregnene-17α,21-diol-3,11,20-trione.
4. 4,4-dimethyl-Δ⁵-pregnene-17α,21-diol-3,20-dione.
5. The C–21 hydrocarbon carboxylic acid esters of less than 12 carbon atoms of 4,4-dimethyl-Δ⁵-pregnene-17α,21-diol-3,20-dione.
6. 4,4-dimethyl-Δ⁵-pregnene-11β,17α,21-triol-3,20-dione.
7. The C–21 hydrocarbon carboxylic acid esters of less than 12 carbon atoms of 4,4-dimethyl-Δ⁵-pregnene-11β,17α,21-triol-3,20-dione.
8. 4,4-dimethyl-Δ⁵-pregnene-3β,17α,21-triol-11,20-dione.
9. The hydrocarbon carboxylic acid diesters of less than 12 carbon atoms of 4,4-dimethyl-Δ⁵-pregnene-3β,17α,21-triol-11,20-dione.
10. 4,4-dimethyl-Δ⁵-pregnene-3β,17α,21-triol-20-one.
11. The hydrocarbon carboxylic acid diesters of less than 12 carbon atoms of 4,4-dimethyl-Δ⁵-pregnene-3β,17α,21-triol-20-one.
12. A compound of the following formula:

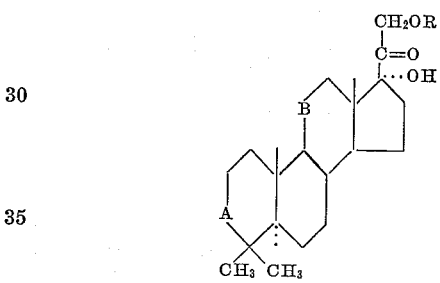

wherein A is selected from the group consisting of carbonyl, β-hydroxymethylene and β-hydrocarbon carboxylic acyloxymethylene of less than 12 carbon atoms; B is selected from the group consisting of methylene, carbonyl and β-hydroxymethylene and R is selected from the group consisting of hydrogen and a hydrocarbon carboxylic acyl group of less than 12 carbon atoms.

13. 4,4-dimethyl-allopregnane-3β,17α,21-triol-11,20-dione.
14. The hydrocarbon carboxylic acid diesters of less than 12 carbon atoms of 4,4-dimethyl-allopregnane-3β,17α,21-triol-11,20-dione.
15. 4,4-dimethyl-allopregnane-3β,11β,17α,21-tetrol-20-one.
16. The hydrocarbon carboxylic acid diesters of less than 12 carbon atoms of 4,4-dimethyl-allopregnane-3β,11β,17α,21-tetrol-20-one.
17. 4,4-dimethyl-allopregnane-3β,17α,21-triol-20-one.
18. The hydrocarbon carboxylic acid diesters of less than 12 carbon atoms of 4,4-dimethyl-allopregnane-3β,17α,21-triol-20-one.

References Cited in the file of this patent
UNITED STATES PATENTS

| 2,662,854 | Miescher et al. | Dec. 15, 1953 |
| 2,773,074 | Djerassi et al. | Dec. 4, 1956 |
| 2,888,456 | Beylor et al. | May 26, 1959 |
| 2,951,074 | Chemerda et al. | Aug. 30, 1960 |
| 2,981,743 | Ringold et al. | Apr. 25, 1961 |

FOREIGN PATENTS

| 796,769 | Great Britain | June 18, 1958 |

OTHER REFERENCES
Adams et al.: J.C.S. (London), 1956, pp. 4490–4495.
Caspi: J. Org. Chem., vol. 24, 1959, pp. 669–673.